US009895782B2

(12) United States Patent
Schneider et al.

(10) Patent No.: US 9,895,782 B2
(45) Date of Patent: Feb. 20, 2018

(54) LINEAR DRIVE FOR MACHINING OF AN OPTICAL WORKPIECE

(71) Applicant: Schneider GmbH & Co. KG, Fronhausen (DE)

(72) Inventors: Gunter Schneider, Marburg (DE); Ulf Börner, Lichtenstein (DE); Klaus Hofmann, Wehrheim (DE)

(73) Assignee: Schneider GmbH & Co. KG, Fronhausen (DE)

( * ) Notice: Subject to any disclaimer, the term of this patent is extended or adjusted under 35 U.S.C. 154(b) by 649 days.

(21) Appl. No.: 14/376,188

(22) PCT Filed: Feb. 6, 2013

(86) PCT No.: PCT/EP2013/000352
§ 371 (c)(1),
(2) Date: Aug. 1, 2014

(87) PCT Pub. No.: WO2013/117327
PCT Pub. Date: Aug. 15, 2013

(65) Prior Publication Data
US 2014/0375146 A1 Dec. 25, 2014

(30) Foreign Application Priority Data
Feb. 6, 2012 (EP) ..................................... 12000763

(51) Int. Cl.
*B23Q 5/34* (2006.01)
*B23Q 11/00* (2006.01)
*B24B 13/06* (2006.01)
*H02K 41/02* (2006.01)
*B24B 47/04* (2006.01)
*B29D 11/00* (2006.01)
*H02K 41/03* (2006.01)
(Continued)

(52) U.S. Cl.
CPC ................. *B23Q 5/34* (2013.01); *B23Q 5/28* (2013.01); *B23Q 11/0032* (2013.01); *B23Q 11/0035* (2013.01); *B24B 13/06* (2013.01); *B24B 47/04* (2013.01); *B29D 11/00932* (2013.01); *H02K 41/02* (2013.01); *H02K 41/031* (2013.01); *H02K 41/035* (2013.01)

(58) Field of Classification Search
CPC ...... H02K 41/02; H02K 41/025; H02K 41/03; H02K 41/031; H02K 41/035; H02K 41/0352; H02K 41/0354; H02K 41/0356
USPC ......... 310/12.01, 12.13, 12.14, 12.15, 12.21, 310/12.24, 12.31, 12.32
See application file for complete search history.

(56) References Cited

U.S. PATENT DOCUMENTS 5,053,660 A * 10/1991 Sneddon ................. F16H 25/20
251/129.11
6,523,443 B1 2/2003 Hof et al.
(Continued)

*Primary Examiner* — John K Kim
*Assistant Examiner* — Minki Chang
(74) *Attorney, Agent, or Firm* — David S. Safran

(57) ABSTRACT

A linear drive and its use for machining an optical workpiece are proposed, the linear drive having a linear movable rotor, a linearly movable compensating body and an electrical compensating drive for movement of the compensating body opposite to the rotor and the rotor extending into the compensating drive and/or a first bearing arrangement mounting the rotor in a torsionally stiff manner and a second bearing arrangement pivotally mounting the rotor.

11 Claims, 3 Drawing Sheets

(51) Int. Cl.
B23Q 5/28 (2006.01)
H02K 41/035 (2006.01)

(56) References Cited

U.S. PATENT DOCUMENTS

| | | |
|---|---|---|
| 6,744,155 B1 | 6/2004 | Stoiber |
| 7,357,054 B2 | 4/2008 | Schneider et al. |
| 7,905,692 B2 | 3/2011 | Hamura et al. |
| 8,056,453 B2 | 11/2011 | Savoie |
| 8,097,989 B2 | 1/2012 | Hamura et al. |
| 8,683,897 B2 | 4/2014 | Schneider et al. |
| 2002/0057952 A1 | 5/2002 | Haferkorn |
| 2005/0172729 A1 | 8/2005 | Gonzalez et al. |
| 2006/0266146 A1* | 11/2006 | Waide ................ F16H 25/2252 74/424.92 |
| 2008/0060273 A1* | 3/2008 | Bochen ................... H02K 7/06 49/340 |
| 2009/0242224 A1* | 10/2009 | Hamura ................ B23Q 1/017 173/152 |
| 2011/0050005 A1* | 3/2011 | Schneider ............... B23Q 1/40 310/12.05 |

* cited by examiner

LINEAR DRIVE FOR MACHINING OF AN OPTICAL WORKPIECE

BACKGROUND OF THE INVENTION

Field of the Invention

This invention relates in general to the machining of preferably optical surfaces or workpieces, especially mirrors or lenses, especially preferably by face turning. In particular, this invention relates to a linear drive and to a use of this linear drive for mechanical treatment or machining, preferably turning and face turning, of a preferably optical or metallic workpiece, especially an optical surface or lens.

Description of Related Art

This invention relates especially to machining on a lathe and to face turning. By means of a linear drive which is often also called a fast tool drive or fast tool arrangement, a tool, especially a turning tool or lathe tool, depending on the rotary position of the work which is to be machined, is moved or fed linearly. In particular, back and forth motion and also oscillating motion or reciprocating motion take place. Thus, especially non-rotationally symmetrical machining can take place and non-rotationally symmetrical surfaces or free-form surfaces can be produced, in particular to implement desired optical properties of an optical component such as a mirror or a lens.

European Patent Application EP 1 647 360 A2 and corresponding U.S. Pat. No. 7,357,054 B2 show a linear drive in the aforementioned sense with a linearly movable rotor which bears a tool for machining. The rotor is movably mounted in bearings via leaf springs. The high forces at high accelerations of the rotor and vibrations and inaccuracies resulting therefrom during machining are problems.

German Patent Application DE 10 2005 052 314 A1, which corresponds to U.S. Pat. No. 8,056,453 B2, shows a linear drive with an air-cushioned rotor. The high forces at high accelerations of the rotor and vibrations and inaccuracies resulting therefrom during machining are problems.

International Patent Application Publication WO 97/13603 A2 and corresponding U.S. Pat. No. 6,523,443 B1 disclose a machine tool for machining of optical surfaces, on a stiff machine bed a spindle being mounted on which a blank for optical surface machining can be held. A first linear drive bears a turning tool which can be moved in the axial direction of the spindle. For dynamic mass compensation, the machine tool has a second linear drive which is located collinearly to the first linear drive and whose housing or stator is mechanically coupled to the housing or stator of the first linear drive via the machine bed and which is triggered in the opposite direction to the first linear drive. The machine tool and the linear drives which are provided are structurally very large. The linear drives are relatively inert and are not optimized in particular for rapid, highly dynamic movement.

German Patent Application DE 198 10 996 A1 and corresponding U.S. Pat. No. 6,744,155 B1 disclose a momentum-decoupled direct drive with a movable driven part and an assigned reaction part which is built especially as a primary part with electrical windings. The reaction part is movably supported on a substructure so that when the driven part moves the reaction part executes an opposite motion. Therefore, this direct drive is built only of one linear motor. In particular, the reaction part is coupled to the substructure via a spring element. Optimum compensation or momentum decoupling therefore cannot be achieved.

German Utility Model DE 200 19 035 U1, which corresponds to U.S. Patent Application Publication 2002/0057952 A1, discloses a machine tool with a linearly movable slide which bears a tool. In order to preclude mass forces of the slide which is to be accelerated vertically, there is weight compensation from two compensating masses which work in opposite directions. The compensating masses are each coupled to the slide via pinions which are connected to drives which are not shown, the pinions on the one hand meshing with racks of the slide and on the other with racks of the compensating masses. Therefore, here, there is mechanical coupling of the movable slide to the compensation masses, and a rotary drive, especially therefore not a direct drive. This structure is unsuited or too slow for the especially intended machining of optical surfaces or workpieces.

SUMMARY OF THE INVENTION

The object of this invention is to devise a linear drive and a use of a linear drive, which enable very accurate and rapid motion of a rotor of the linear drive, very accurate and rapid machining of a workpiece, such as a lens, and/or a compact structure. While the term "rotor" is used throughout the specification and claims, it is intended in the sense of a movable inductor, in the case of the present invention, the movement is not rotational, but rather is linear, as described herein.

This object is achieved by a linear drive and the use thereof as is described herein.

One aspect of this invention is that the linear drive has a linearly movable compensating body and an electrical compensating drive for movement of the compensating body opposite to the rotor. Thus, a reduction or even compensation of reaction forces which occur in particular in rapid movements or high accelerations of the rotor are possible. Furthermore, very accurate machining of the workpiece is enabled. The rotor extends into the compensation drive and/or compensating body or even through it(them). Thus, an extremely compact structure of the linear drive or of a machining device with such a linear drive is enabled.

In particular, the linear drive in accordance with the invention has an electrical rotor drive which is made as a linear motor, and an electrical compensating drive which is made as a linear motor. Therefore, the rotor drive forms a linear direct drive for the rotor, and thus, for the assigned tool. As a result, the compensating drive especially forms a direct drive for the compensating body. The linear drive in accordance with the invention, accordingly, has preferably two separate linear motors or direct drives. Especially preferably, the indicated drives and linear motors or their coils are electrically wired such that when current flows, opposite motion of the rotor, on the one hand, and of the compensating body, on the other, is automatically caused. In accordance with the invention, therefore, preferably only electrical coupling of the compensating motion of the compensating body to the movement of the rotor or tool takes place.

Another aspect of this invention which can also be independently implemented is that the linear drive has a first bearing arrangement and a second bearing arrangement which is spaced axially relative thereto for the axially movable rotor, the first bearing arrangement supporting the rotor in a torsionally stiff manner, and unable to turn, therefore guides it against twisting, and the second bearing arrangement pivotally bears the rotor. In this way, the bearing arrangements can be prevented from applying unwanted torsion forces to the rotors. This is conducive to an easy and very rapid movement of the rotor and very accurate machining of a workpiece. Moreover, this is conducive to a simple and compact structure.

According to another preferred aspect of this invention, the rotor has a rotor section and a guide section which is smaller in cross section and/or in the outer contour. Especially preferably, the guide section is made elongated, bar-like and/or cylindrical. This enables a very light and compact execution of the rotor with very accurate longitudinal guidance of the rotor, especially via two axially spaced bearing arrangements. For example, the first bearing arrangement can movably support the rotor section and the second bearing arrangement can support the guide section in the direction of motion. Thus, a simple and/or compact structure is enabled or supported. Furthermore the rotor can be made very light. This is conducive to rapid movement and very accurate and fast machining.

Individual ones of the aforementioned and following aspects and features of this invention can be optionally combined with one another, but can also be implemented independently of one another.

Other aspects, advantages and properties of this invention will become apparent from the following description of a preferred exemplary embodiment with reference to the accompanying drawings.

DETAILED DESCRIPTION OF THE INVENTION

Figure 1:
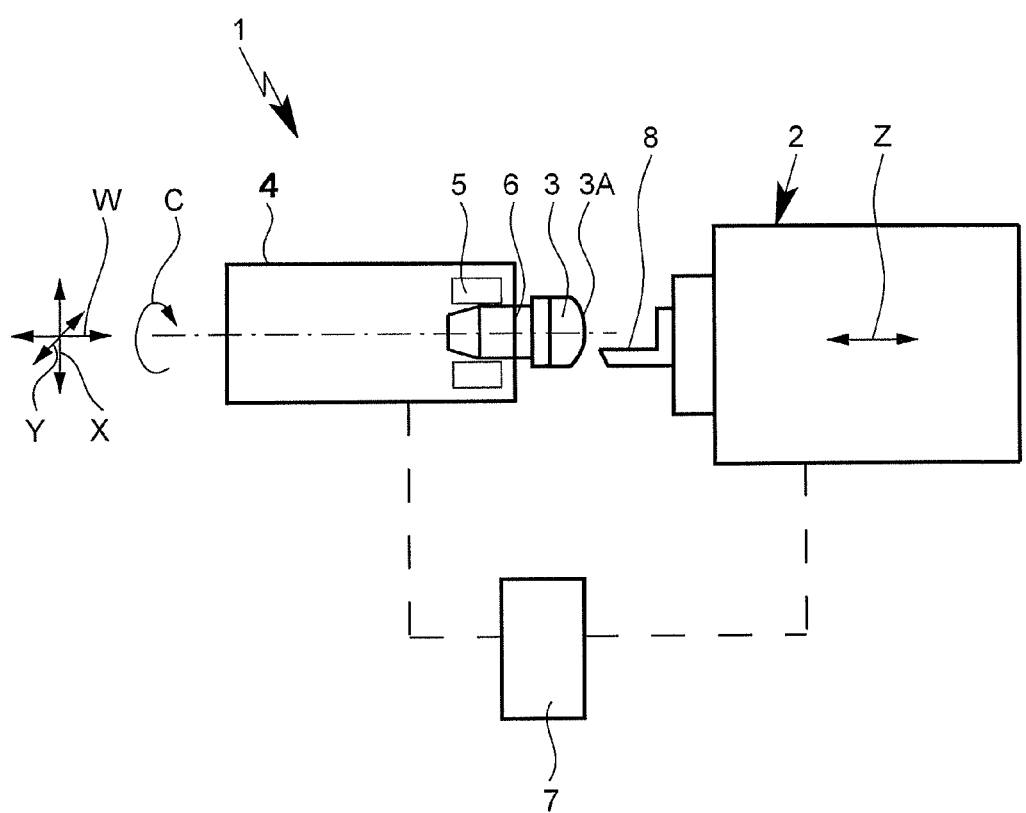
FIG. 1 shows a schematic structure of a device in accordance with the invention with a linear drive in accordance with the invention.

FIG. 1 schematically shows a device 1 in accordance with the invention and a linear drive 2 in accordance with the invention for machining of a preferably optical workpiece 3, especially an optical surface, for example a heads-up display, mirror or a lens. Preferably, machining of the workpiece or its surface or flat side 3A takes place by turning, especially by face turning.

The starting point for forming or machining is a blank. The blank is machined or in some other way formed, optionally in other working steps, such that at the end there is a finished optical workpiece 3 with the desired optical properties. The term "workpiece or work" within the scope of this specification designates preferably both the blank before executing the necessary machining steps, and also at the end, the finished workpiece 3.

The workpiece 3 is formed preferably of metal or plastic, but fundamentally some other material which can be suitably worked can also be used.

In the illustrated preferred embodiment, the device 1 preferably has a work spindle 4. The work spindle 4 is especially a preferably directly driven, precisely mounted shaft or a direct drive or some other drive, each with a preferably integrated or assigned interface or collet or holder 5 for the workpiece 3 or the blank. Fundamentally, direct reception or clamping can take place, preferably the workpiece 3 or the blank however can be held indirectly via a holder. The workpiece 3 or the holder 6 is then clamped, as indicated in FIG. 1, for example, by means of a membrane chuck.

The workpiece 3 or the holder 6 can preferably be clamped in a certain axial position and/or rotary position in order to be able to machine the workpiece 3 in a defined manner. To do this, the holder 6 can also be built in several parts; this is known especially from the prior art.

The clamped workpiece 3 can be set into rotation for machining around an axis of rotation C by means of the work spindle 4. Therefore, the work spindle 4 forms, in particular, a rotary drive for the workpiece 3. The work spindle 4 forms in particular a computed or controlled axis of rotation C. Especially preferably, the workpiece 3 can be set into rotation in a controlled manner with a certain rpm and/or with a defined rotary position.

Preferably, the device 1 for control of the work spindle 4 and/or for control of the linear drive 2 and/or for other control purposes has a control apparatus 7 which can be formed in particular by a memory-programmable control (CNC control, e.g., a numerical or computer-based control) or the like or can contain one and/or can control such a control.

The machining of the workpiece 3 takes place preferably by cutting, especially by means of a tool 8, in particular a turning tool, lathe tool, or the like. The tool 8 is held by the linear drive 2 and can be moved by means of the linear drive 2 relative to the workpiece 3 linearly in one direction of motion, as indicated by the double arrow Z in FIG. 1.

Preferably, the work spindle 4 with the workpiece 3 which is to be machined can be fed or positioned in a W direction (preferably in the direction of the spindle axis or axis of rotation C) relative to the tool 8 or linear drive 2 and/or can be moved in an X direction transversely or perpendicular to the W or Z direction. Furthermore, the workpiece 3 or work spindle 4 can optionally also be moved in a Y direction transversely or perpendicular to the X direction and/or W or Z direction relative to the tool 8. Fundamentally, also other or additional directions and/or axes of movement are possible.

If necessary the axial alignment of the rotational or rotary axis C of the work spindle 4 can also run obliquely to the W, X and/or Y direction or axis.

The directions or axes W and X run preferably at least essentially horizontally. The direction or axis Y runs preferably at least essentially vertically.

Preferably, the movement in the Y direction or the Y axis is used solely for fine adjustment or vertical adjustment in order to ensure that the tool 8 can be moved by the axis C of rotation in transverse feed in the X direction, therefore the workpiece 3 or flat side 3A can also be machined in the region of the axis C of rotation.

The adjustability in the Y direction or the Y axis is formed by a solid articulation and/or a drive for solely fine adjustment.

Especially preferably, a computed or controlled W axis, X axis and/or Y axis or corresponding linear axes are formed.

In the illustrated example, the axis of motion or linear axis Z runs preferably at least essentially parallel to the axis of rotation or rotary axis C of the workpiece 3. The direction of the Z axis, on the one hand, and the direction of the W axis or the axial alignment of the axis of rotation or axis of rotation C, on the other hand, can run parallel to one another or inclined relative to one another and/or can be adjusted or tilted relative to one another, for example, to be able to produce or machine the flat side 3A of a Fresnel lens or a Fresnel mirror. For relative tilting, it is preferably limited or is very small such that the preferred face turning can take place for machining of the workpiece 3 in the desired or required manner.

Preferably, the W axis is used for basic feed of the workpiece and tool 8, especially over larger travel or feed paths, for example with high curvature and a large diameter of the surface or flat side 3A which is to be machined or produced and/or for example for clamping or changing of the workpiece 3 and/or tool 8. Preferably movement of the W axis and in the W direction which is dependent on the rotary position of the workpiece 3 or the rotary spindle 4 does not take place.

Preferably, the linear drive 2 is an electrically operating axle drive, especially a so-called fast tool drive, to control or move the tool 8 rapidly back and forth especially depending on the rotary position of the workpiece 3 and/or depending on the distance of the tool 8 from the axis of rotation of the work spindle 4 in its axial position or Z axis. The linear drive 2 allows a preferably linear and/or controlled movement of the tool 8, and therefore, preferably forms a controlled linear axis Z.

The linear axis Z, in contrast to the W axis, forms a preferably highly dynamic or high-speed axis or movement, especially depending on the rotational position of the workpiece or work spindle 4. The linear drive 2 is used especially therefore for very rapid movement of the tool 8 in the Z direction depending on the rotary position of the workpiece with however a comparatively small stroke. The maximum stroke or travel path of the linear drive 2 or tool 8 is preferably several mm, especially more than 10 mm or 12 mm, especially preferably roughly 15 mm, especially at frequencies of movement of more than 25 or 50 Hz and/or at accelerations of more than 50 m/s$^2$ or 100 m/s$^2$, especially preferably of roughly 300 m/s$^2$. The tool 8 can be repeatedly moved backward and forward in the Z direction during one revolution of the workpiece 3.

The control of the Z axis, therefore the movement of the rotor 9, and thus, of the tool 8, takes place preferably via the control apparatus 7, in particular the rotary position of the workpiece 3 being detectable via an angle transducer (not shown) or the like, especially on or in the work spindle 4.

During the machining of the workpiece 3, the lens 3 is preferably moved relative to the tool 8 in the X direction and/or Y direction, in order to enable the desired surface machining, especially of one surface or flat side 3A. To do this, the work spindle 4 and the linear drive 2 can be moved accordingly relative to one another, for example, via a compound slide (not shown), or the like.

In particular, machining can take place or there can be a structure of the device 1 as is described, for example, in European Patent Application EP 0 849 038 A2 or German Patent Application DE 10 2009 011 194 A2 which corresponds to U.S. Pat. No. 8,683,897.

The device 1 preferably has a housing, a machine bed, a frame or the like (not shown) and which indirectly supports the work spindle 4 and the linear drive 2, for example, via a compound slide, rotary table or the like, (not shown), or directly.

Fundamentally, the workpiece 3 and the tool 8 can also be interchanged or there can be kinematic reversal.

Figure 2:
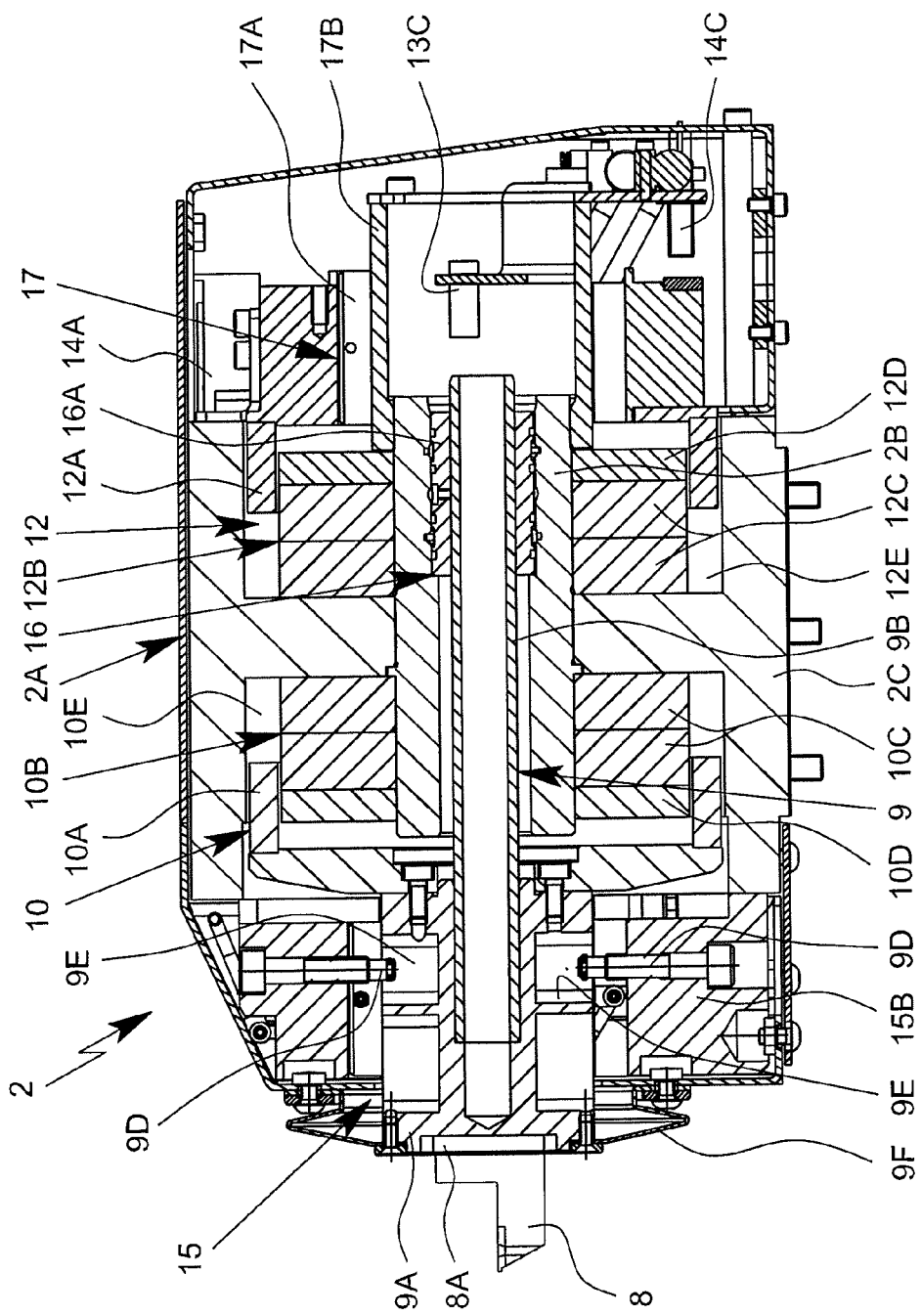
FIG. 2 is a longitudinal sectional view of the linear drive.
Figure 3:
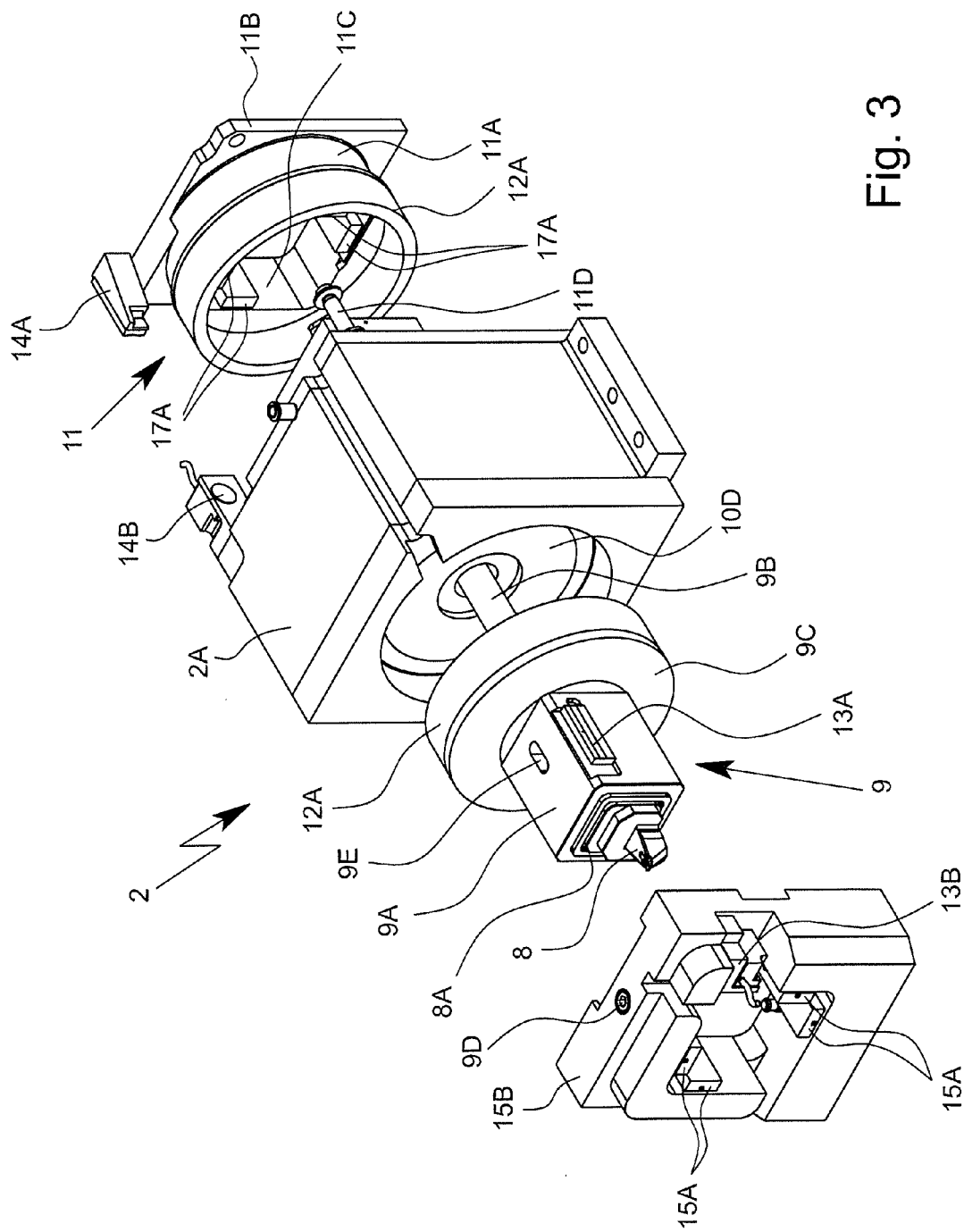
FIG. 3 is a schematic exploded view of the linear drive.

One preferred structure of the linear drive 2 in accordance with the invention is explained in detail below. In this case, reference is made in particular to the schematic section as shown in FIG. 2 and the exploded representation as shown in FIG. 3.

The linear drive 2 has an axially movable rotor 9. The rotor 9 bears or forms a fixture 8A for the tool 8. The tool 8 is therefore preferably joined or can be joined securely to the rotor 9, but is especially interchangeable.

The axial motion of the rotor 9 and thus of the tool 8 runs in the Z direction. The latter represents the axis of motion of the linear drive 2, of the rotor 9 and of the tool 8.

The rotor 9 preferably has a front or tool-side rotor section 9A and a preferably rear guide section 9B.

The rotor section 9A has preferably an at least essentially polygonal or rectangular, especially at least essentially square cross section. For example the guide section 9A is made at least essentially cuboidal. But other configurations and shapes are also possible.

The fixture 8A for especially detachable holding of the tool 8 is located preferably on the rotor section 9A. Especially preferably the tool 8 is located or held in the region of one face side on the rotor 9 or rotor section 9A.

The guide section 9B preferably has an at least essentially round cross section and/or is preferably made cylindrical. Especially preferably the guide section 9B is made corrugated, bolt-like or rod-like.

The guide section 9B is preferably made much thinner than the rotor section 9A. In particular, the guide section 9B has a smaller diameter or cross section than the rotor section 9A. In the illustrated example, the diameter of the guide section 9B is preferably smaller than half of the minimum or maximum diameter of the rotor section 9A.

The guide section 9B is held on its tool-side end preferably by the rotor section 9A, especially is inserted into it and/or is connected preferably securely to the rotor section 9A.

The rotor section 9A is preferably made of metal, especially of lightweight metal, especially preferably of aluminum or an aluminum alloy.

The guide section 9B is made preferably of metal, especially steel.

The linear drive 2 has an electrical rotor drive 10 which is assigned to the rotor 9 for axial movement of the rotor 9. The rotor drive 10 is especially a linear motor for moving the rotor 9.

The rotor drive 10 preferably has an electrical coil 10A and an assigned magnet arrangement 10B. In the illustrated and preferred exemplary embodiment, the coil 10A is preferably connected to the rotor 9 or its rotor section 9A, preferably via a connecting plate 9C. The coil 10A can be electrically operated. Corresponding electrical connections or connecting lines are not shown, for reasons of simplification.

The connecting plate 9C is preferably produced from an electrically insulating and/or heat insulating material. The coil 10A is accordingly preferably insulated thermally and/or electrically relative to the rotor 9 or rotor section 9A.

The connecting plate 9C is preferably made very stiff and/or in the manner of a ring-shaped disk. But, other configurations and shapes are also possible.

The magnet arrangement 10B is preferably installed permanently in a housing 2A of the linear drive 2, therefore is installed so as to be stationary or immovable. In other words, the magnet arrangement 10B, in contrast to the coil 10A, preferably cannot move together with the rotor 9.

By corresponding electrical triggering of the coil 10A, especially via the control apparatus 7, the electrical rotor drive 10 allows a controlled movement, especially movement back and forth, of the rotor 9 and of the assigned tool 8 in the Z direction.

The linear drive 2 preferably has a linearly movable compensating body 11 and an assigned electrical compensating drive 12. The compensating drive 12 is used to move the compensating body 11 opposite to the rotor 9. Especially preferably the compensating body 11 can be moved coaxially to the rotor 9, therefore along the Z axis.

To reduce or compensate for forces, torques or vibrations which occur especially in very rapid movements or high accelerations of the rotor 9, the compensating body 11 can be moved preferably opposite to the rotor 9 by means of the compensating drive 12. In particular, dynamic mass compensation is formed by opposite movement of preferably masses which are preferably at least essentially of the same size.

The compensating drive 12 preferably has an electrical coil 12A and an assigned magnet arrangement 12B. In particular, the compensating drive 12 is an electrical linear motor for axial movement of the compensating body 11. The coil 12A is preferably assigned to the compensating body 11, especially is securely connected to it. The electrical connections or connecting lines of the coil 12A are not shown, for reasons of simplification. The magnet arrangement 12B is located preferably fixed or stationary, especially is installed in the housing 2A of the linear drive 2.

The compensating body 11 is preferably made ring-like. The compensating body 11 preferably in the axial direction is made much shorter and/or in diameter larger than the rotor 9. This is conducive to a compact structure.

The compensating body 11 preferably has a body section 11A which is made preferably at least essentially tubular or sleeve-like and/or bears the assigned coil 12A especially on the face side, especially preferably on the end facing the tool 8.

The compensating body 11 preferably has a guide section 11B which is made especially at least essentially plate-like and/or flange-like, in the front view especially preferably at least essentially rectangular or square. Preferably, the guide section 11B adjoins the body section 11A on the back end or the end facing away from the coil 12A.

The body section 11A has a preferably at least essentially cylindrical outside contour. The compensating body 11 or at least its body section 11A in the illustrated example has preferably a non-round, especially essentially polygonal or square inside contour and/or central opening 11C.

Preferably, the rotor drive 10 and the compensating drive 12 are aligned oppositely and/or on opposite sides of the linear drive 2 or housing 2A.

Preferably, the coils 10A, 12A, the magnet arrangements 10B, 12B and/or the drives 10, 12 are made at least essentially identical.

In the illustrated embodiment, the coils 10A, 12A are preferably made at least essentially hollow-cylindrical and/or ring-like and/or as plunger coils.

In the illustrated example the magnet arrangements 10B and 12B are made preferably at least essentially ring-like. In particular the magnet arrangements 10B, 12B each have one or more permanent magnets 10C, 12C and/or one especially ring disk-like pole disk 10D, 12D which is preferably located on the face side.

The linear drive 2 or the housing 2A has preferably an especially sleeve-like carrier 2B which is located preferably in the housing 2A or a housing part 2C or is formed or supported thereby and/or around which the magnet arrangements 10B, 12B are located. In particular, the carrier 2B bears the magnet arrangements 10B, 12B. Especially preferably, the magnet arrangements 10B, 12B are located oppositely on the carrier 2B or are slipped onto the carrier 2B from opposite sides.

In the illustrated example, the carrier 2B is inserted into a central opening of the housing 2A or housing part 2C and is held by it. Preferably, the carrier 2B is held by an intermediate wall of the housing part 2C, for example, is inserted through an opening of the intermediate wall. But, other designs are also possible.

Preferably, the pole disks 10D and 12D of the magnet arrangement 10B and 12B point in opposite directions or are located on opposite face sides.

Preferably, the carrier 2B is formed of a magnetic material, especially brass.

The drives 10, 12 comprise or form preferably one plunger coil arrangement. In particular, the coils 10A, 12A can dip into a corresponding annular space 10E, 12E, therefore form plunger coils. The annular space 10E or 12E is formed preferably between the inner magnet arrangement 10B, 12B, on the one hand, and the housing 2A or housing part 2C or a corresponding radially spaced wall of a corresponding recess, on the other.

Preferably, the coils 10A, 12A are arranged to the corresponding magnet arrangement 10B, 12B and/or are made such that they can interact with the respective corresponding magnet arrangement 10B or 12B, especially the magnet arrangement 10B, 12B and the assigned coil 10A, 12A being able to alternately magnetically attract or repel. In this way, a magnetic or electromagnetic linear motor is formed.

A "linear motor" is generally defined as a linear direct drive.

Therefore, the linear drive 2 has preferably two separate linear motors or drives 10, 12. They are preferably mechanically coupled to the housing 2A or to housing part 2C of the linear drive 2 only via their stationary magnet arrangements 10B, 12B.

The movements of the rotor 9, on the one hand, and of the compensating body 11, on the other, are preferably mechanically decoupled and in particular are only drive-correlated or drive-coupled by electrical coupling or control of the drives 10, 12.

Preferably, the drives 10, 12 and their coils 10A, 12A are electrically wired such that, when a current is flowing, opposite movements of the rotor 9, on the one hand, and of the compensating body 11, on the other, are automatically caused.

Due to the opposite movement of the compensating body 11, the reaction forces, torques, and vibrations which occur especially in rapid movements or high accelerations of the rotor 9 can be at least largely reduced or compensated so that, in any case, small resulting forces, torques and/or vibrations of the linear drive 2 or its housing 2A act on a corresponding frame, a substructure, a machine bed or the like of the device 1.

Especially preferably, the mass of the compensating body 11 corresponds at least essentially to the total mass of the rotor 9, the tool 8 and the connecting plate 9C.

For at least essentially the same or even identical mass of the rotor 9 and the parts which are connected to it, therefore, which are moving at the same time, on the one hand, and of the compensating body 11 and of the parts which are connected to it and which are moving at the same time, on the other, the result can be the fact that the compensating motion which has been carried out by the compensating body 11 opposite to the movement of the rotor 9 requires the same or at least essentially the same stroke. In particular a corresponding control can be very easily implemented. But, it is fundamentally also possible for the masses which are moving in opposite directions, therefore the rotor 9 and the parts which are connected to it, on the one hand, and the compensating body 11 and the parts which are connected to it, on the other, to be different.

Calibration of the device 1 and of the linear drive 2 can take place by corresponding triggering of the respective drive 10 or 12 and corresponding detection and evaluation of the respective movement or position of the rotor 9 or of the compensating body 11.

To detect the position of the rotor 9 and thus of the tool 8, the linear drive 2 preferably has a first measurement apparatus 13. The measurement apparatus 13 preferably works optically. In the illustrated example, the measurement apparatus 13 has a scale 13A and an assigned sensor or reading head 13B, as indicated schematically in FIG. 3. The scale 13A is preferably located on the rotor 9 or its rotor section 9A, in particular located on an outer flat side or held in a recess.

The first measurement apparatus 13 can alternatively or additionally also have a proximity switch 13C, especially as indicated in FIG. 2, especially preferably in order to be able to detect a certain position or end position of the rotor 9 and thus of the scale 13A for calibration purposes.

The linear drive 2 preferably has a second measurement apparatus 14 for detecting the position of the compensating body 11, as indicated in FIG. 2.

The second measurement apparatus 14 works preferably optically. Preferably, the second measurement apparatus 14 has a scale 14A and an assigned sensor or reading head 14B, as indicated in FIG. 3. The scale 14A is preferably located on the compensating body 11, especially the guide section 11B.

The second measurement apparatus 14 can alternatively or additionally also have a proximity switch 14C, especially as indicated in FIG. 2, especially preferably in order to be able to detect a certain position or end position of the compensating body 11, and thus, of the scale 14A for calibration purposes.

The linear drive 2 preferably has a first bearing arrangement 15 and a second bearing arrangement 16 which is spaced axially to the latter for the rotor 9. The first bearing arrangement 15 is preferably located near the tool or adjacent to the tool 8. The first bearing arrangement 15 acts preferably on the rotor section 9A.

The second bearing arrangement 16 is preferably located on the back end or on the end of the rotor 9 away from the tool. The second bearing arrangement 16 acts preferably on the guide section 9B.

In the illustrated example, the first bearing arrangement 15 mounts the rotor 9 or rotor section 9A such that the rotor 9 is axially movable, therefore can move in the Z direction, but cannot twist, therefore is guided in a torsionally stiff manner.

The second bearing arrangement 16 preferably mounts the rotor 9 or guide section 9B such that the rotor 9 is axially movable, therefore can move in the Z direction, but can also twist. The rotor 9 or guide section 9B is therefore not guided in torsion or rotationally.

In particular, the rotor 9 is air-cushioned.

In the illustrated example, the first bearing arrangement 15 has one or more air-cushion bearing elements 15A which guide the rotor 9 or rotor section 9A, especially preferably in the region of two corner areas which are diagonally opposite in a face section. The air-cushion bearing elements 15A are preferably held or carried stationary by an assigned bearing section or bearing frame 15B, as indicated in FIG. 3.

The bearing frame 15B is preferably held securely by the housing 2A or housing part 2C or is permanently joined to it.

Especially preferably, the housing 2A or the bearing frame 15B bears the sensor or reading head 13B of the first measurement apparatus 13. The sensor or reading head 14B of the second measurement apparatus 14 in the illustrated example is preferably attached to the housing 2A.

The second bearing arrangement 16 preferably has at least one air-cushion bearing element 16A which is held or carried especially preferably by the carrier 2B, is especially inserted into the carrier 2B, as is indicated in FIG. 2. The air-cushion bearing element 16A is made preferably sleeve-shaped or hollow-cylindrical. In the illustrated example, it is penetrated by the rotor 9 or guide section 9B.

The linear drive 2 preferably has a third bearing arrangement 17 for axially movable support of the compensating body 11. Preferably, the compensating body 11 is air-cushioned in the same manner as the rotor 9. The third bearing arrangement 17 therefore preferably has one or more air-cushion bearing elements 17A.

In contrast to the first and second bearing arrangement 15, 16, in the third bearing arrangement 17, the air-cushion bearing elements 17A are not stationary, but preferably together with the compensating body 11 are movable, therefore are supported in particular by the compensating body 11 or its body section 11A. In particular, the air-cushion bearing elements 17A in the illustrated example are located in the region of two diametrically opposite corner regions of the central opening 11C, as indicated in FIG. 3. However, other configurations and arrangements are also possible.

A bearing section 17B for forming opposite bearing surfaces is assigned to the air-cushion bearing elements 17A. The bearing section 17B has preferably an at least essentially polygonal, rectangular or square outer contour in a front view and forms, with its flat outside surfaces, matching thrust bearing surfaces for the assigned air-cushion bearing elements 17A. The bearing section 17B in the illustrated example is held preferably by the housing 2A or housing part 2C or carrier 2B. But, other designs are also possible.

The air-cushion bearings 15A, 16A and 17A are preferably made pad-like, and/or are provided with depressions on their bearing sides which are supplied or pressurized via lines which are not shown with pressurized gas or compressed air, so that between the respective air-cushion bearing element 15A, 16, 17A, on the one hand, and the assigned thrust bearing surface on the other at a corresponding gas pressure a gap, especially an air cushion, is formed. In particular, a gap is formed between each air-cushion bearing element 15A and the rotor 9 or rotor section 9A, between the air-cushion bearing element 16A and the rotor 9 or guide section 9B and/or between each air-cushion bearing element 17A and the bearing section 17B at a corresponding gas pressure. Accordingly, the rotor 9 and the compensating weight 11 can be axially moved more or less free of friction.

The air-cushion bearing arrangement in accordance with the invention allows very easy and/or torsion-free movement of the rotor 9.

The approach in accordance with the invention allows a very compact structure, especially of the rotor 9 and of the linear drive 2.

The approach in accordance with the invention allows very easy implementation of the rotor 9 and accordingly rapid movements.

In accordance with the invention, dynamic mass compensation or compensation of reaction forces with a very compact structure is enabled.

In particular, the rotor drive 10 or its coil 10A is located between the bearing arrangements 15 and 16.

In particular, the rotor 9 or its guide section 9B extends into or through the rotor drive 10.

In particular, the rotor 9 or its guide section 9B extends into or through the compensating drive 12.

In particular, the rotor 9 or its guide section 9B extends into or through the magnet arrangement 10B, 12B of the rotor drive 10 and/or the compensating drive 12.

In particular, the rotor 9 or its guide section 9B extends into or through the coil 10A, 12A of the rotor drive 10 and/or the compensating drive 12.

The linear drive 2 has preferably a stroke limiting apparatus 9D for limiting the axial stroke or the axial movement of the rotor 9 and/or a stroke limiting apparatus 11D for limiting the axial stroke or the axial movement of the compensating body 11, as indicated in FIG. 2.

Preferably, the stroke limiting apparatus 9D acts on the rotor section 9A.

In the illustrated example, the stroke limiting apparatus 9D has at least one bolt or at least one screw, especially two bolts or screws which fit into the corresponding recesses 9E of the rotor 9 or rotor section 9A, the axial length of the recesses 9E being chosen such that the desired axial stroke of the rotor 9 is enabled. However, other designs are also possible.

The stroke limiting apparatus 11D in the illustrated example is preferably attached on one face side of the housing 2A and/or extends axially through the compensating body 11 or its guide section 11B or a corresponding bore, as is shown schematically in FIG. 3. However other designs are also possible.

The housing 2A is preferably at least largely closed, especially for protection against dirt.

On the tool side, there is preferably a bellows 9F, especially an expansion bellows or the like for sealing between the rotor 9 or rotor section 9A on the one hand and the housing 2A or bearing frame 15B on the other. But other designs are also possible.

The linear drive 2 or its housing 2A, the housing part 2C and/or the carrier 2B has or have preferably internal cooling channels (not shown).

Individual features and aspects of the device 1 or of the linear drive 2 can also be implemented independently of one another and in any combination.

The invention claimed is:

1. A linear drive for machining of an optical workpiece by means of a tool, comprising
a linearly movable rotor which bears or forms a fixture for the tool, and
an electrical rotor linear drive for moving the rotor,
wherein the electrical rotor linear drive has a first bearing arrangement and an axially spaced second bearing arrangement for the rotor, the first bearing arrangement mounting the rotor in a manner preventing rotation thereof, but permitting axial movement, and the second bearing arrangement mounting the rotor in a manner permitting axial and twisting movements, and
wherein the first bearing arrangement mounts an at least essentially square cross section of the rotor in a region of two diametrically opposite corner regions.

2. The linear drive as claimed in claim 1, wherein at least a coil of the electrical rotor linear drive is located between the bearing arrangements.

3. The linear drive as claimed in claim 1, wherein the rotor has a rotor section and an axially connecting guide section that has a smaller diameter or cross section than the rotor section.

4. The linear drive as claimed in claim 3, wherein the rotor section bears at least one of a coil of the rotor drive and the fixture for the tool.

5. The linear drive as claimed in claim 3, wherein the rotor section has an at least essentially polygonal cross section.

6. The linear drive as claimed in claim 3, wherein the guide section has at least one of an essentially round cross section and a cylindrical shape.

7. The linear drive as claimed in claim 1, wherein the rotor is air-cushioned.

8. The linear drive as claimed in claim 1, wherein the electrical rotor linear drive has a coil which is connected to the rotor, and a stationary magnet arrangement.

9. The linear drive as claimed in claim 8, wherein the rotor extends into or through the magnet arrangement.

10. The linear drive as claimed in claim 1, wherein the electrical rotor linear drive has a linearly moveable compensating body and an electrical compensating linear drive motor for movement of the compensating body in a direction opposite to the rotor.

11. A linear drive for machining of an optical workpiece by means of a tool, comprising
a linearly movable rotor which bears or forms a fixture for the tool, and
an electrical rotor linear drive for moving the rotor,
wherein the linear drive has a first bearing arrangement and an axially spaced second bearing arrangement for the rotor, the first bearing arrangement mounting the rotor in a manner preventing rotation thereof, but permitting axial movement, and the second bearing arrangement mounting the rotor in a manner permitting axial and twisting movements,
wherein the linear drive has a third bearing arrangement for axially moveable support of the compensating body,
wherein the compensating body is air-cushioned and
wherein the air-cushioned bearing elements of the third bearing arrangement are moveable together with the compensating body.

* * * * *